United States Patent
Koskinen et al.

(10) Patent No.: US 12,335,844 B1
(45) Date of Patent: Jun. 17, 2025

(54) CELL BARRING

(71) Applicant: Nokia Technologies Oy, Espoo (FI)

(72) Inventors: Jussi-Pekka Koskinen, Oulu (FI);
Samuli Heikki Turtinen, Oulu (FI);
Jakub Janusz Bluszcz, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 19/013,398

(22) Filed: Jan. 8, 2025

(30) Foreign Application Priority Data

Feb. 1, 2024 (GB) .................................. 2401327

(51) Int. Cl.
*H04W 48/02* (2009.01)
*H04W 8/22* (2009.01)
*H04W 36/08* (2009.01)

(52) U.S. Cl.
CPC .............. *H04W 48/02* (2013.01); *H04W 8/22* (2013.01); *H04W 36/08* (2013.01)

(58) Field of Classification Search
CPC ........ H04W 8/22; H04W 36/08; H04W 48/02
See application file for complete search history.

(56) References Cited

U.S. PATENT DOCUMENTS

| | | | |
|---|---|---|---|
| 2020/0374076 A1 | 11/2020 | Wang et al. | |
| 2020/0413450 A1* | 12/2020 | Kim | H04W 36/0077 |
| 2024/0187967 A1* | 6/2024 | He | H04W 72/51 |
| 2025/0063447 A1* | 2/2025 | Liu | H04L 27/26025 |

FOREIGN PATENT DOCUMENTS

| | | |
|---|---|---|
| WO | 2023/048547 A1 | 3/2023 |
| WO | 2023/176383 A1 | 9/2023 |

OTHER PUBLICATIONS

"3rd Generation Partnership Project; Technical Specification Group Radio Access Network; NR; User Equipment (UE) radio access capabilities (Release 18)", 3GPP TS 38.306, V18.0.0, Dec. 2023, pp. 1-303.

"3rd Generation Partnership Project; Technical Specification Group Radio Access Network; NR; NR and NG-RAN Overall Description; Stage 2 (Release 18)", 3GPP TS 38.300, V18.0.0, Dec. 2023, pp. 1-265.

"3rd Generation Partnership Project; Technical Specification Group Radio Access Network; NR; Radio Resource Control (RRC) protocol specification (Release 18)", 3GPP TS 38.331, V18.0.0, Dec. 2023, pp. 1-1608.

(Continued)

*Primary Examiner* — Justin Y Lee
(74) *Attorney, Agent, or Firm* — Nokia Technologies Oy

(57) ABSTRACT

There is provided a method performed by a user equipment, the method comprising: supporting at least one of a first reception mode with only one receive (Rx) branch or a second reception mode with at least two Rx branches; detecting, from a network node associated with a cell, at least one of a first barring indication associated with the first reception mode or a second bar-ring indication associated with the second reception mode; determining whether a predetermined condition is met based on the supported at least one reception mode and at least one of the first barring indication and the second barring indication; and determining that the cell is barred for the user equipment when the predetermined condition is met.

12 Claims, 4 Drawing Sheets

(56) References Cited

OTHER PUBLICATIONS

"Summary of [AT115-e][104][RedCap] Identification, access and camping restrictions (Ericsson)", 3GPP TSG-RAN WG2 Meeting #115e, R2-2108892, Agenda: 8.12.2.2, Ericsson, Aug. 16-27, 2021, pp. 1-25.
"3rd Generation Partnership Project; Technical Specification Group Radio Access Network; NR; User Equipment (UE procedures in Idle mode and RRC Inactive state (Release 18)", 3GPP TS 38.304, V18.0.0, Dec. 2023, pp. 1-56.
Search Report received for corresponding United Kingdom Patent Application No. 2401327.8, dated Sep. 20, 2024, 6 pages.
"RRC running CR for mobile IAB", 3GPP TSG-RAN WG2 Meeting #123, R2-2309282, Ericsson, Aug. 21-25, 2023, 26 pages.
"Consideration on 1 Rx/2Rx determination from network perspective", 3GPP TSG-RAN WG2 Meeting #122, R2-2305397, Agenda: 6.1.3.1, ZTE Corporation, May 22-26, 2023, 3 pages.
"Clarification on cell barred indication for RedCap UEs", 3GPP TSG-RAN WG2 Meeting #121bis-e, R2-2303286, Agenda: 6.1.3.1, ZTE Corporation, Apr. 17-26, 2023, 5 pages.
"Early Identification and Camping Restrictions for Redcap UEs", 3GPP TSG-RAN WG2 Meeting #115 electronic, R2-2108698, Agenda: 8.12.2.2, CATT, Aug. 16-27, 2021, 3 pages.
International Search Report and Written Opinion received for corresponding Patent Cooperation Treaty Application No. PCT/EP2025/051585, dated Apr. 3, 2025, 12 pages.
"3rd Generation Partnership Project; Technical Specification Group Radio Access Network; NR; Radio Resource Control (RRC) protocol specification (Release 17)", 3GPP TS 38.331, V17.2.0, Sep. 2022, pp. 1-1298.

\* cited by examiner

CELL BARRING

RELATED APPLICATION

This application claims priority from GB Patent Application No. 2401327.8, filed on Feb. 1, 2024, which is hereby incorporated in its entirety.

TECHNICAL FIELD

Various example embodiments relate generally to cell barring.

BACKGROUND

In wireless communications, access nodes of a cellular radio network may be configured to provide communication services to devices, such as user equipment (UE), via cells. The cellular radio network may be configured to serve different types of devices, such as for example reduced capability (RedCap) devices, which may be targeted for low cost, low energy consumption, and/or low data rate applications, for example in industrial wireless sensor networks. Cells of the cellular radio network may be barred from access for various reasons. Before attempting to access the network, a UE may be configured to evaluate broadcast information of the cell and determine whether a connection request to the cell is allowed or not.

BRIEF DESCRIPTION

According to some aspects, there is provided the subject matter of the independent claims. Some further aspects are defined in the dependent claims. The embodiments that do not fall under the scope of the claims are to be interpreted as examples useful for understanding the disclosure.

LIST OF THE DRAWINGS

In the following, the invention will be described in greater detail with reference to the embodiments and the accompanying drawings, in which FIG. 1 presents a network to which one or more embodiments are applicable;

DESCRIPTION OF EMBODIMENTS

Figure 1:
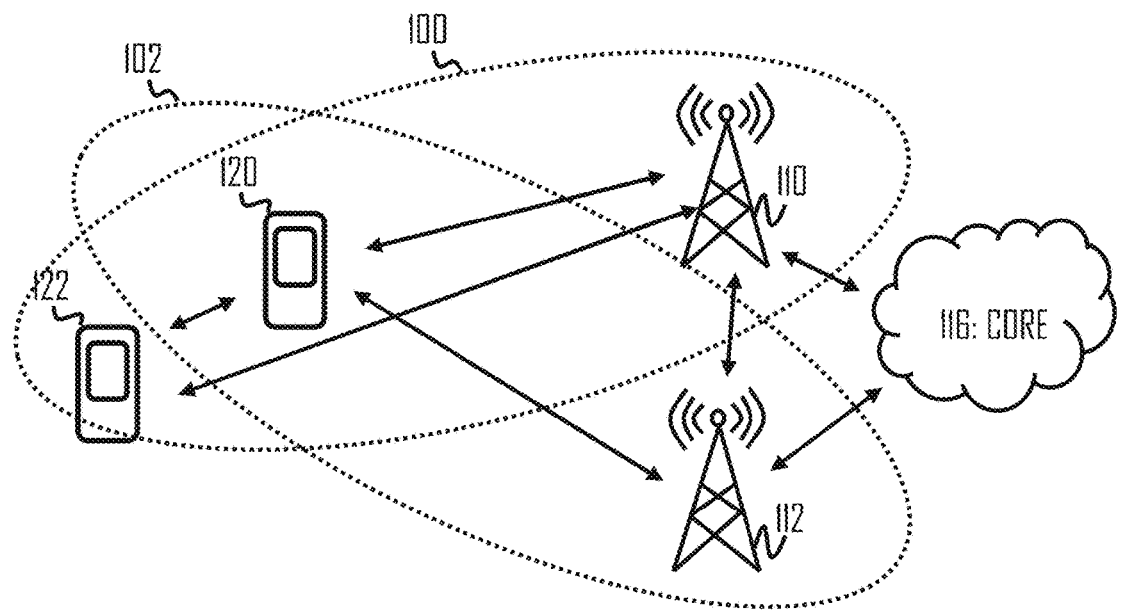

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. Further, when a particular feature, structure, or characteristic is described in connection of an embodiment, it is within the knowledge of one skilled in the art to apply such feature, structure, or characteristic in connection with other embodiments whether or not explicitly described. It shall be understood that although the terms "first," "second" and the like may be used herein to describe various elements, these elements should not be limited by these terms. These terms are only used to distinguish one element from another.

For the purposes of the present disclosure, the phrases "at least one of A or B", "at least one of A and B", and "A and/or B" means (A), (B), or (A and B). For the purposes of the present disclosure, the phrase "A, B, and/or C" means (A), (B), (C), (A and B), (A and C), (B and C), or (A, B, and C).

Embodiments described may be implemented in a communication network, such as any of the following radio access technologies (RATs): Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and enhanced LTE (eLTE), 5G (also called NR), or any future RAT such as 6G. Moreover, communication within the communication network may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), and/or Discrete Fourier Transform spread OFDM (DFT-s-OFDM).

As used herein, the term "network device" or "network node" refers to a node in a communication network via which user equipment may access the network and/or which is capable of controlling radio communication and managing radio resources within a cell. The network node or network device may be referred to as a base station (BS), an access point (AP) or an access node. The network device may be, depending on the applied technology, for example, a node B (NodeB or NB), an evolved NodeB (eNodeB or eNB), an NR NB (also referred to as a gNB), a Remote Radio Unit (RRU), a radio head (RH), a remote radio head (RRH), a relay, an Integrated Access and Backhaul (IAB) node, a low power node, a non-terrestrial network (NTN) or non-ground network device such as a satellite network device, a low earth orbit (LEO) satellite and a geosynchronous earth orbit (GEO) satellite, or an aircraft network device.

Moreover, in connection of split radio access network (RAN), the network device may refer to a centralised unit (CU) of a base station and/or a distributed unit (DU) of a base station. An interface between CU and DU may be referred to as an F1 interface in NR. In the split RAN architecture, node operations may be carried out, at least partly, in the central/centralized unit, CU, (e.g. server, host or node) operationally coupled to the DU, (e.g. a radio head/node). One CU may control one or more DUs, acting at least as transmit/receive (Tx/Rx) nodes. In some embodiments, the DUs may comprise e.g. a radio link control (RLC), medium access control (MAC) layer and a physical (PHY) layer, whereas the CU may comprise the layers above RLC layer, such as a packet data convergence protocol (PDCP) layer, a radio resource control (RRC) and an internet protocol (IP) layers. Other functional splits are possible too. In practice, any processing task may be performed in either the CU or the DU and the boundary where the responsibility is shifted between the CU and the DU may depend on the applied implementation.

The term "terminal device" refers to any end device that may be capable of wireless communication. By way of example, a terminal device may be referred to as a communication device, user equipment (UE), a Subscriber Station (SS), or a Mobile Station (MS). The terminal device may include a mobile phone, a cellular phone, a smart phone, voice over IP (VoIP) phones, wireless local loop phones a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, USB dongles, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like.

A term "resource", as used herein, may refer to radio resources in time domain, in frequency domain, in space domain, and/or in code domain. Some examples of resources include e.g. a physical resource block (PRB), a radio frame, a subframe, a time slot, a subband, a frequency region, a sub-carrier, a beam, etc. The term "transmission" and/or "reception" may refer to wirelessly transmitting and/or receiving via a wireless propagation channel on radio resources.

FIG. 1 illustrates an example of a communication network to which examples disclosed herein may be applied. The communication network or a cellular communication network may comprise a network node 110 providing one or more cells, such as cell 100, and a network node 112 providing one or more other cells, such as cell 102. Each cell may be, e.g., a macro cell, a micro cell, femto, or a pico cell, for example. The cell may define a coverage area or a service area of the corresponding access node.

The network node 110 may provide a user equipment (UE) 120 (one or more UEs) with wireless access to the communication network. The wireless access may comprise downlink (DL) communication from the network node to the UE 120 and uplink (UL) communication from the UE 120 to the network node. Examples of uplink channels comprise physical uplink control channel (PUCCH) for transmitting control information and physical uplink shared channel (PUSCH) for transmitting data towards the network. Examples of downlink channels comprise physical downlink control channel (PDCCH) for transmitting control information and physical downlink shared channel (PDSCH) for transmitting data towards the user equipment.

There may be a plurality of UEs 120, 122 in the system. Each of them may be served by the same or by different control nodes 110, 112. The UEs 120, 122 may communicate with each other, in case device-to-device (D2D) communication interface is established between them via a so-called sidelink (SL). Such D2D communications may be referred to as machine-to-machine, peer-to-peer (P2P) communications, or vehicle-to-vehicle (V2V), for example.

In the case of multiple network nodes in the communication network, the network nodes may be connected to each other via an interface. LTE specifications call such an interface as X2 interface. An interface between an LTE node and a 5G node, or between two 5G nodes may be called Xn interface.

The network nodes 110 and 112 may be further connected via another interface to a core network 116 of the communication network. The LTE specifications specify the core network as an evolved packet core (EPC), and the core network may comprise e.g. a mobility management entity (MME) and a gateway node. The MME may handle mobility of terminal devices in a tracking area encompassing a plurality of cells and handle signalling connections between the terminal devices and the core network. The gateway node may handle data routing in the core network and to/from the terminal devices. The 5G specifications specify the core network as a 5G core (5 GC). The 5G core may comprise e.g. an access and mobility management function (AMF) and a user plane function/gateway (UPF) and other functions. The AMF may handle termination of non-access stratum (NAS) signalling, NAS ciphering & integrity protection, registration management, connection management, mobility management, access authentication and authorization, security context management. The UPF node may support packet routing and forwarding, packet inspection and quality of service (QoS) handling, for example.

Reduced capability (RedCap) UE types introduced by the 3GPP standard enables reduced UE complexity through various UE complexity reduction techniques including but not limited to reduction of maximum UE bandwidth, reduction of number of Rx branches, reduction of maximum number of DL MIMO layers, relaxation of maximum modulation order and the addition of HD-FDD mode of operation.

Main motivation for the new Rel-17 RedCap and Rel-18 enhanced RedCap (eRedCap) device types is to lower the device cost and complexity and sometimes also UE power consumption (as compared to high-end eMBB and URLLC devices of Rel-15 and Rel-16) to address the mid-range use cases including but not limited to industrial sensors, video surveillance and wearables. A target for supported peak data rate may be for example 10 Mbps. A RedCap device may be a category of devices which have at least one reduced capability when compared to another category of devices (e.g., non-RedCap devices).

Capabilities of devices belonging to the RedCap category or other categories may be for example defined in standards. As an example, a RedCap UE is a UE with reduced capability, wherein the reduced capability may refer to one or more of the following:

- The maximum bandwidth is 20 MHz for FR1, and is 100 MHz for FR2. UE features and corresponding capabilities related to UE bandwidths wider than 20 MHz in FR1 or wider than 100 MHz in FR2 are not supported by RedCap UEs;
- The maximum mandatory supported DRB number is 8;
- The mandatory supported PDCP SN length is 12 bits while 18 bits being optional;
- The mandatory supported RLC AM SN length is 12 bits while 18 bits being optional;
- For FR1, 1 DL MIMO layer if 1 Rx branch is supported, and 2 DL MIMO layers if 2 Rx branches are supported; for FR2, either 1 or 2 DL MIMO layers can be supported, while 2 Rx branches are always supported. For FR1 and FR2, UE features and corresponding capabilities related to more than 2 UE Rx branches or more than 2 DL MIMO layers, as well as UE features and capabilities related to more than 1 UE Tx branch or more than 1 UL MIMO layer are not supported by RedCap UEs;
- CA, MR-DC, DAPS, CPAC and IAB (i.e., the RedCap UE is not expected to act as IAB node) related UE features and corresponding capabilities are not supported by RedCap UEs.

An enhanced RedCap UE (eRedCap UE) may be a UE with reduced peak data rate and, with or without reduced baseband bandwidth in FR1, and that fulfils one or more of the following:

The maximum bandwidth is 20 MHz for FR1. UE features and corresponding capabilities related to UE bandwidths wider than 20 MHz in FR1 are not supported by eRedCap UEs. eRedCap UEs do not support operation in FR2 and in FR1 60 kHz SCS.

CA, MR-DC, DAPS, CPAC and IAB (i.e., the eRedCap UE is not expected to act as IAB node) related UE features and corresponding capabilities are not supported by eRedCap UEs.

Support of various types of (e)RedCap UEs (which is used to refer to either eRedCap UE or RedCap UE) in the mobile network requires additional functionality on the network side, that may be or may not be available in the network or in some parts of the network, i.e., network support for (e)RedCap UEs may be limited to some cells, base stations, frequencies or frequency bands. The reduction in UE complexity comes at a price of the lower efficiency of air interface communication and/or reduced DL radio coverage. The need for additional network functionalities and/or (e)RedCap UEs' worse air interface performance (in comparison to non-RedCap UEs) results in a need for (e)RedCap specific access and camping restrictions. For example, access and camping of (e)RedCap UEs with 1 Rx branch and 2 Rx branches can be allowed separately via system information. In addition, (e)RedCap UEs in Half-Duplex FDD mode can be allowed (i.e. access and camping is allowed) via system information. A RedCap specific IFRI can be provided in SIB1, and when absent, RedCap UEs access is not allowed. An eRedCap specific IFRI can be provided in SIB1, and when absent, eRedCap UEs access is not allowed. Information on which frequencies (e)RedCap UE access is allowed can be provided in system information.

One specific example of the above access and camping restriction settings may include network optimization aimed at:
- directing (e)RedCap UEs with 1Rx branch and therefore characterized by worse DL coverage (in comparison to UE with 2Rx branches) to the cells on lower frequencies, where their worsen DL coverage is to some extent compensated by the lower signal pathloss.
- directing (e)RedCap UEs with 2Rx branches and therefore characterized by better DL coverage (in comparison to UE with 1Rx branch) to the cells on higher frequencies with the higher pathloss.

These can be achieved by the configuration of following SIB1 parameter settings by the network:
- for lower frequency cells: cellBarredRedCap1Rx=notBarred, cellBarred-eRedCap1Rx=notBarred, cellBarredRedCap2Rx=barred, cellBarred-eRedCap2Rx=barred
- for higher frequency cells: cellBarredRedCap1Rx=barred, cellBarred-eRedCap1Rx=barred, cellBarredRedCap2Rx=notBarred, cellBarred-eRedCap2Rx=notBarred.

The above use case is mentioned here merelyto give a practical example of the cell settings where the cell access is not barred for 1Rx (e)RedCap UEs and is barred for 2Rx (e)RedCap UEs. The above use case is not intended to limit the scope, i.e., any other combination of (e)RedCap barring parameter settings is also possible.

The (e)RedCap UE support for 1Rx or 2Rx operation in FR1 is associated with the number of supported DL MIMO layers:
- For a RedCap UE with 1 Rx branch, 1 DL MIMO layer is supported.
- For a RedCap UE with 2 Rx branches, 2 DL MIMO layers are supported.

Therefore, the UE support for 1Rx or 2Rx operation in FR1 may be determined based on the lack/absence of maxNumberMIMO-LayersPDSCH or presence of maxNumberMIMO-LayersPDSCH=twoLayers within UE radio access capabilities. Since, the maxNumberMIMO-LayersPDSCH is of FSPC type, i.e. signaled per feature set per component carrier (per CC per band per band combination), it is possible that:
- (e)RedCap UE supports 1Rx operation on some band(s) and 2Rx on some other band(s), and/or
- (e)RedCap UE supports 1Rx and 2Rx operation on the same band (UE signals two feature sets, one without maxNumberMIMO-LayersPDSCH and the other with maxNumberMIMO-LayersPDSCH=twoLayers, where both corresponds to the same band), and/or
- (e)RedCap UE supports multiple SCSs for a given band, but only for a subset of supported SCSs the UE supports 2Rx operation while the UE supports 1Rx operation for the remaining SCSs.

The UE supports all or a subset of frequency bands signaled in the list of multiple frequency bands in SIB1 (frequencyBandList in FrequencyInfoDL-SIB) and UE supports 1Rx operation on some band(s) and 2Rx on some other band(s) from this subset.

Therefore, it is possible that UE supports both 1Rx and 2Rx operation on same or different bands. It is also important to note, that since determination of (e)Redcap UE support for 1Rx and/or 2Rx operation may be based on the standard UE radio access capabilities parameters, the proposed embodiments may be used by (e)RedCap UE to determine whether the cell is barred or not barred (based on UE's own UE radio access capabilities) and/or and/or network/gNB to determine whether to accept or reject the incoming handover request for a (e)RedCap UE (based on UE radio capabilities provided in handover request signalling and the target cell's (e)RedCap 1Rx and/or 2Rx support configuration.

It is noted that according to 3GPP standard specifications (e)RedCap UEs with 1 Rx branch and 2 Rx branches can be allowed separately via system information, by use of e.g.
- cellBarred-eRedCap1Rx: Value barred means that the cell is barred for an eRedCap UE with 1 Rx branch. This field is ignored by non-eRedCap UEs.
- cellBarred-eRedCap2Rx: Value barred means that the cell is barred for an eRedCap UE with 2 Rx branches. This field is ignored by non-eRedCap UEs.
- cellBarredRedCap1Rx: Value barred means that the cell is barred for a RedCap UE with 1 Rx branch. This field is ignored by non-RedCap UEs.
- cellBarredRedCap2Rx: Value barred means that the cell is barred for a RedCap UE with 2 Rx branches. This field is ignored by non-RedCap UEs.

According to the current specification a cell can be barred for the (e)RedCap UE which is equipped with 1Rx branch or 2Rx branches. However, a UE can support both 1Rx and 2Rx operation (i.e. dual support), where the support of 1Rx or 2Rx operation may be limited to certain frequency bands. Therefore, UE behaviour is not clear, because currently barring is determined based whether the UE is equipped with 1Rx or 2Rx branches. For example, if 1Rx is not barred and 2Rx is barred in the cell, UE supporting both 1Rx and 2Rx operation could either determine in such a case that the cell is always barred or never determine that the cell is barred (regardless of how the UE supports the 1Rx/2Rx operation in that particular cell). At the same time, it is not clear in the above cases whether the UE that gained access to the cell had the right to do so and whether, after checking its radio capacity by the network, its connection should not be terminated in the course of cell barring enforcement procedures.

Based on above, solutions are needed for a problem where the UE supports both 1Rx and 2Rx operation, but the network allows access for 1Rx or 2Rx but not for both. Furthermore, problems may also exist when there are differences in the 1Rx and/or 2Rx support with respect to bands and/or SCSs. For example, there may be problems when:
(e)RedCap UE supports both 1Rx and 2Rx operation, but the support of 2Rx operation is limited to a subset of the frequency bands from the set of frequency bands supported by the (e)RedCap UE, and/or
(e)RedCap UE supports both 1Rx and 2Rx operation, but the support of 2Rx operation is limited to a subset of SCSs from the set of SCSs supported by the (e)RedCap UE for a given frequency bands, and/or
(e)RedCap UE supports both 1Rx and 2Rx operation for a given frequency band, but not necessarily both for the SCS of the Initial BWP for the downlink or of RedCap-specific initial downlink BWP, if configured; and/or
the cell carrier belongs to multiple frequency bands where one or more of these frequency bands are supported by (e)RedCap UE, and the (e)RedCap UE supports 1Rx operation on some of the bands and 2Rx on some other bands.

Figure 2:
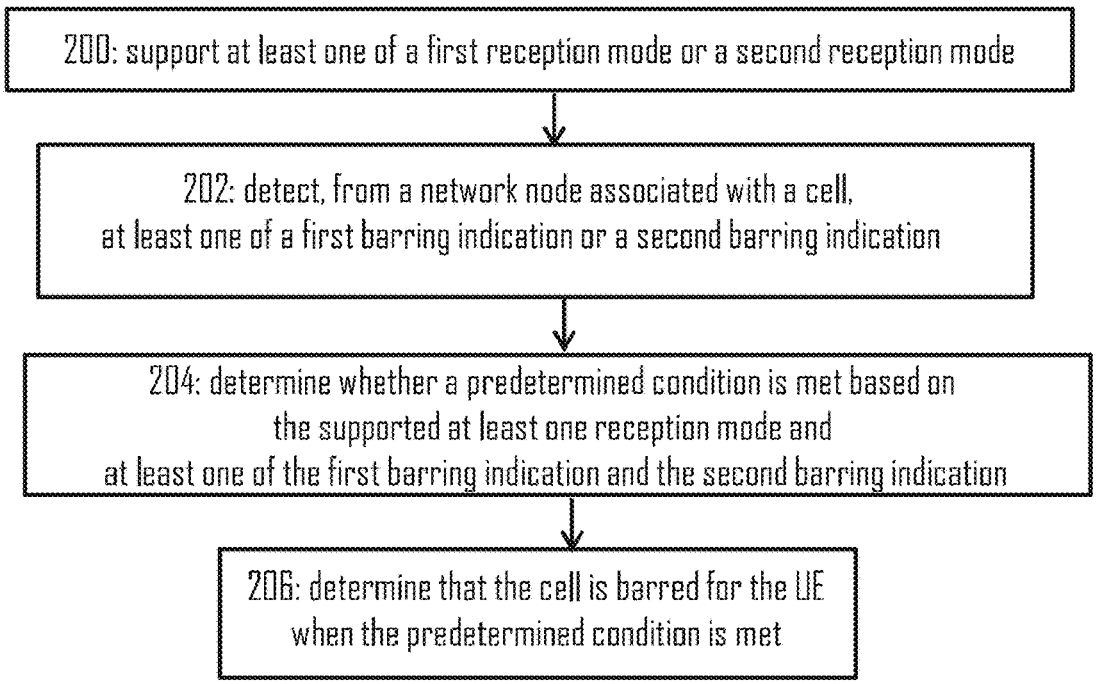
FIGS. 2 and 3 show method, according to some embodiments.

FIG. 2 depicts an example method. The method may be computer-implemented. The method may be performed by a user equipment, such as UE 120 of FIG. 1, which may be a (e)RedCap UE.

As shown in FIG. 2 step 200, the UE support at least one of a first reception mode with only one receive (Rx) branch or a second reception mode with at least two Rx branches. These are called 1Rx and 2Rx modes or reception modes, respectively. In an embodiment, the UE determines its capability of operating in at least one or both of 1Rx and 2Rx modes in the current cell per UE supported frequency band(s) and per UE supported SCS(s) on these band(s). The UE may then further take into account one or more of the frequency band(s) of the cell, sub-carrier spacing (SCS) of the band(s) of the cell, and the SCS of an initial downlink bandwidth part. Initial DL BWP configuration (possibly including the SCS) is a property of the cell. It is indicated in SIB1 to the UEs and it is common to all UEs in the cell or common to all RedCap UEs if it is RedCap-specific Initial DL BWP. Initial BWP is common to all bands of the cell.

In an embodiment the UE supports both the first and the second reception modes, i.e. supports both 1Rx and 2Rx modes in the cell. The first reception mode is supported by a user equipment with one Rx branch supporting reception of one downlink MIMO layer, wherein the second reception mode is supported by a user equipment with two Rx branches supporting reception of two downlink MIMO layers.

In step 202, the UE receives, from a network node associated with a cell, e.g. from the gNB 110 providing or controlling the cell 100, at least one of a first barring indication associated with the first reception mode or a second barring indication associated with the second reception mode. For example, the first barring indication (also called 1Rx barring indication) may be cellBarredRedCap1Rx or cellBarred-eRedCap1Rx, which are intended for UEs supporting 1Rx mode. For example, the second barring indication (also called 2Rx barring indication) may be cellBarredRedCap2Rx or cellBarred-eRedCap2Rx, which are intended for UEs supporting 2Rx mode. Each barring indication indicates whether a UE supporting the respective reception mode is allowed to access the cell. By accessing it is meant whether the UE can camp on the cell (due to cell selection or re-selection), for example. Furthermore, handover admittance in the target cell may utilize the same algorithms based on UE capabilities and the target cell's configuration.

In one embodiment the UE receives both the first and the second barring indications. In one embodiment, the indications are opposite, i.e. the first barring indication indicates 'barred' while the second barring indication indicates 'not barred', or vice versa. It is noted that lack of barring indication may be interpreted as 'not barred'.

In an embodiment, the barring indication(s) is/are received in system information, such as SIB1. In an embodiment the firstbarring indication and/or the second barring information is received or detected when the user equipment enters the coverage area of the cell. However, it is noted that the barring indication(s) can be received also at other time instants, e.g. when system information modification is received.

In step 204, the UE determines whether a predetermined condition is met. The determination is based on the supported at least one reception mode and at least one of the first barring indication and the second barring indication. In step 206, the UE may determine that the cell is barred for the UE when the predetermined condition is met. In such case, the UE may decide not to camp in the cell. In other words, the UE may then refrain from cell selection or cell re-selection to this cell, when the cell is determined to be barred. Alternatively, the UE may determine that the cell is not barred for the UE when predetermined condition is not met.

Let us look at some exemplary embodiments in more details.

In an embodiment, the predetermined condition is met when the second barring indication indicates that the cell is barred, regardless of the what the first barring indication indicates. This may be valid for UEs supporting both reception modes on the same or on different frequency bands, or valid for UEs supporting only the second reception mode. In one example, the UE determines that the cell is barred if cellBarred-RedCap2Rx indicates "barred" and the UE is RedCap UE supporting 1Rx and 2Rx operation, regardless of the cellBarred-RedCap1Rx barring indication (i.e. if such indication is received, the UE would ignore the indication). In another example, the UE determines that the cell is barred if cellBarred-eRedCap2Rx indicates "barred" and the UE is eRedCap UE supporting 1Rx and 2Rx operation, regardless of the cellBarred-eRedCap1Rx barring indication (i.e. if such indication is received, the UE would ignore the indication).

By 'regardless' it is meant in the above examples that even if cellBarredRedCap1Rx barring indication or cellBarred-eRedCap1Rx barring indication would indicate the opposite than cellBarredRedCap2Rx barring indication or cellBarred-eRedCap2Rx barring indication, the UE would follow what cellBarredRedCap2Rx barring indication or cellBarred-eRedCap2Rx barring indication indicates and would ignore cellBarredRedCap1Rx barring indication or cellBarred-eRedCap1Rx barring indication.

In an embodiment, the predetermined condition is not met when the second barring indication indicates that the cell is not barred, regardless of the what the first barring indication indicates. This may be valid for UEs supporting both reception modes on the same or on different frequency bands, or valid for UEs supporting only the second reception mode. In one example, UE determines that the cell is not barred if cellBarred-RedCap2Rx indicates "notBarred" and the UE is RedCap UE supporting 1Rx and 2Rx operation, regardless of the cellBarred-RedCap1Rx barring indication in the absence of any other reasons causing the cell to be considered barred. In another example, the UE determines that the cell is not barred if cellBarred-eRedCap2Rx indicates "notBarred" and the UE is eRedCap UE supporting 1Rx and 2Rx operation, regardless of the cellBarred-eRedCap1Rx barring indication in the absence of any other reasons causing the cell to be considered barred.

In an embodiment, the predetermined condition is met when the first barring indication indicates that the cell is barred, regardless of the what the second barring indication indicates (i.e. if such indication is received, the UE would ignore the indication). This may be valid for UEs supporting both reception modes on the same or on different frequency bands, or valid for UEs supporting only the first reception mode.

In an embodiment, the predetermined condition is not met when the first barring indication indicates that the cell is not barred, regardless of the what the second barring indication indicates (i.e. if such indication is received, the UE would ignore the indication). This may be valid for UEs supporting both reception modes on the same or on different frequency bands, or valid for UEs supporting only the first reception mode.

In an embodiment, the barring indication(s) is/are cell-specific. In an embodiment, the barring indication(s) is/are common to all frequency bands supported in the cell. In another embodiment, the barring indication(s) are frequency band specific.

It is possible that the cell provides or supports several frequency bands. For example, a multiband cell is a cell that has one frequency channel, but this frequency channel belongs to two or more frequency bands. In other words, there are some frequency bands that partially overlap, and multiband cell has a frequency channel that belongs to this overlapping area. The set of frequency bands supported by the cell's frequency channel/carrier may be provided in a list of frequency bands of the cell in system information, for example.

Each band may have its own barring indication(s), for example. Or, one barring indication (e.g. barring indication for 1Rx UEs and/or barring indication for 2Rx UEs) may be valid for all the frequency bands included in the list of frequency bands, or the first barring indication may be valid for a set of frequency bands (but not all) and the second barring indication may be valid for another set of frequency bands (but not all).

In an embodiment, the network determines a first set of at least one frequency band and a second set of at least one frequency band. The network sends a list indicating the first set of frequency band(s) to the UE. The 1Rx and/or 2Rx barring indication(s) provided from the network to the UE are then valid for the UE only if the UE supports the corresponding 1Rx and/or 2Rx reception mode on at least one of the frequency band(s) included in the list. If not valid for the UE, the UE may ignore the barring indication(s) and e.g. consider the cell as 'not barred'. The barring indication(s) may or may not include an indication that these barring indication(s) are valid only for the frequency bands included in the list. In this example, the network would not include in the list all frequency bands supported by the cell, but only those for which the barring indication(s) are valid. The network could also transmit to the UE a second list comprising the second set of band(s). There could be indication(s) that are valid for the frequency band(s) in this second list. This embodiment might provide an efficient manner of e.g. barring 2Rx UEs from the first set of frequency band(s) while not barring 1Rx UEs from the first set of frequency band(s), and barring 1Rx UEs from the second set of frequency band(s) while not barring 2Rx UEs from the second set of frequency band(s).

In an embodiment, by using such frequency band (or set of frequency bands) specific barring indications, it may be possible, e.g. to direct 1Rx UEs to a lower frequency band of the cell and 2Rx users to a higher frequency band of the cell, to give one exemplary use case.

In another embodiment, it is possible to bar e,g, UEs with only 1Rx reception mode in one cell and direct those UEs to another cell.

Let us look at closer how the frequency band of the UE, and possibly other radio characteristics of the frequency band, may be play a role in determining whether the cell is barred for the UE or not.

In an embodiment, meeting the predetermined condition is further based on the frequency band on which UE supports at least one of the first and second reception modes. As an example, meeting the predetermined condition is further based on whether the frequency band (on which the UE supports at least one of the reception modes) is included in the list of frequency bands received from the gNB associated with the cell. In yet one example, if the user equipment supports one of the first and second reception modes on the frequency band that is included in the list of frequency bands, and the corresponding one of the first or the second barring indication indicates that the cell is barred, the user equipment determines that the cell is barred for that frequency band. If the UE supports both modes on the frequency band included in the list, then in one embodiment the second barring indication dictates whether the cell is barred or not.

In an embodiment, meeting the at least one predetermined condition is further based on whether the user equipment supports at least one of the first and second reception modes on a frequency band with a subcarrier spacing (SCS) corresponding to a SCS of an initial downlink bandwidth part (DL BWP). The initial DL BWP may be, in an embodiment, a (e)RedCap UE specific initial DL BWP, if such is configured. For example, if the user equipment supports e.g. the first reception mode on the frequency band with the SCS corresponding to the SCS of the initial DL BWP and the firstbarring indication indicates the cell is barred, the user equipment determines that the cell is barred for that frequency band. Similarly, if the user equipment supports e.g. both or only the second reception mode on the frequency band with the SCS corresponding to the SCS of the initial DL BWP and the second barring indication indicates the cell is barred, the user equipment determines that the cell is barred for that frequency band. Otherwise, the cell may be determined to be not barred.

As one concrete example, the UE determines that the cell is barred if cellBarred-RedCap1Rx indicates "barred" and the UE is RedCap UE supporting 1Rx for at least one of the frequency bands included in the frequencyBandList with the SCS of the initial downlink BWP or of the RedCap-specific initial downlink BWP (if configured). This embodiment is valid for UEs supporting only 1Rx reception mode.

As another example, the UE determines that the cell is barred if cellBarred-eRedCap1Rx indicates "barred" and the UE is eRedCap UE supporting 1Rx for at least one of the frequency bands included in the frequencyBandList with the SCS of the initial downlink BWP or of the eRedCap-specific initial downlink BWP if configured. This embodiment is valid for UEs supporting only 1Rx reception mode.

As another example, the UE determines that the cell is barred if cellBarred-RedCap2Rx indicates "barred" and the UE is RedCap UE supporting 2Rx for at least one of the frequency bands included in the frequencyBandList with the SCS of the initial downlink BWP or of the RedCap-specific initial downlink BWP if configured. This embodiment is valid for UEs supporting either only 2Rx reception mode or both 1Rx and 2Rx reception modes.

As another example, the UE determines that the cell is barred if cellBarred-eRedCap2Rx indicates "barred" and the UE is eRedCap UE supporting 2Rx for at least one of the frequency bands included in the frequencyBandList with the SCS of the initial downlink BWP or of the eRedCap-specific initial downlink BWP if configured. This embodiment is valid for UEs supporting either only 2Rx reception mode or both 1Rx and 2Rx reception modes.

As one example use case, let us consider a UE that supports one frequency band with 15 kHz SCS and with 30 kHz SCS, and that this frequency band is among the ones to which the carrier of the cell belongs to. Let us further consider that the UE supports 1Rx reception mode for the 15 kHz SCS on that band and has dual support (both 1RX and 2Rx) for 30 kHz SCS on that band. Then, let us assume that the UE determines that the initial DL BWP is associated with 15 kHz SCS (e.g. based on SIB1). Accordingly, the UE can detect that the UE needs to follow the 1Rx barring indication and can discard the 2Rx barring indication. Had the initial DL BWP been associated with 30 kHz SCS, the UE could have determined that the UE needs to follow the 2Rx barring indication and can discard the 1Rx barring indication. Similarly, if the UE would support two frequency bands with different reception mode supports on the bands, the UE would consider the frequency band to which the cell's carrier belongs to for selecting which one of the barring indications to follow. Also, the UE may support multiple frequency bands and multiple SCSs in one or more frequency bands. In other words, selecting which one of the first and second barring indications to take into account, and disregarding the other, may be based on at least one of the following: a subcarrier spacing of the initial downlink bandwidth part of the cell, information about at least one frequency band to which a carrier of the cell belongs to, or which at least one of the first and second reception modes the user equipment supports on which at least one frequency band and for which at least one subcarrier spacing. Thus, the embodiments help in ensuring which barring indication the UE needs to follow in cases where the UE supports several bands and/or SCSs with different reception mode supports. As will be explained below, the network also considers these in order to determine which barring indication the UE follows and in order to determine whether to deny UE's access to the cell (e.g. in connection of handover, for example).

Figure 3:
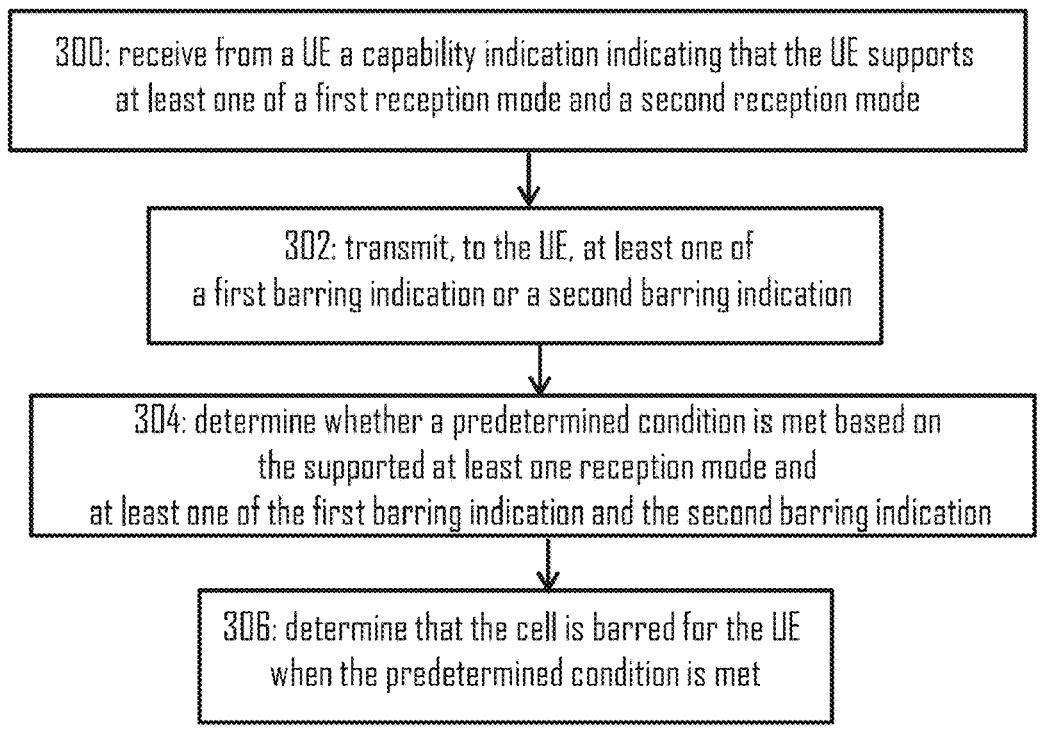

Looking from the network node (e.g. gNB 110) point of view, FIG. 3 depicts an example method. The method may be computer-implemented. The method may be performed by a network node, such as gNB 110 of FIG. 1. As in above examples, the UE may be a (e)RedCap UE.

As shown in FIG. 3, in step 300, the gNB receives from the UE a capability indication indicating that the UE supports at least one of the first reception mode or the second reception mode. This may be sent to the network as part of UE capability information. The reception of UE capabilities by the network may happen during the previous connection (UE capabilities are stored on the network side) or it may take place after the current radio connection is established.

In step 302, the gNB transmits, to the UE, at least one of the first barring indication associated with the first reception mode or the second barring indication associated with the second reception mode.

In step 304, the gNB determines whether the predetermined condition is met based on the supported at least one reception mode and at least one of the first barring indication and the second barring indication. This determination by the gNB follows the same procedures as explained from UE's point of view in above examples. Then, in step 306, the gNB may determine that the cell is barred for the user equipment when the predetermined condition is met, or determine that the cell is not barred for the UE when predetermined condition is not met. If the cell is determined to be barred for the UE, the network may apply barring enforcement procedures against the UE, e.g. release established radio connection with the UE after determining that the cell status for a UE was barred at the time of cell access.

As one example, the network (e.g. the gNB 110) determines that the cell was barred for the RedCap UE supporting 1Rx and 2Rx operation if, at the time the UE accessed that cell, the cellBarred-RedCap2Rx was indicating "barred" regardless of the cellBarred-RedCap1Rx barring indication. This embodiment is valid for UEs supporting both modes or for UEs supporting only 2Rx reception mode.

In one example, network determines that the cell was barred for the eRedCap UE supporting 1Rx and 2Rx operation if, at the time the UE accessed that cell, the cellBarred-eRedCap2Rx was indicating "barred" regardless of the cellBarred-eRedCap1Rx barring indication. This embodiment is valid for UEs supporting both modes or for UEs supporting only 2Rx reception mode.

In one example, network determines that the cell was not barred for the RedCap UE supporting 1Rx and 2Rx operation if, at the time the UE accessed that cell, the cellBarred-RedCap2Rx was indicating "notBarred" regardless of the cellBarred-RedCap1Rx barring indication in the absence of any other reasons causing the cell to be considered barred. This embodiment is valid for UEs supporting both modes or for UEs supporting only 2Rx reception mode.

In one example, network determines that the cell was not barred for the eRedCap UE supporting 1Rx and 2Rx operation if, at the time the UE accessed that cell, the cellBarred-eRedCap2Rx was indicating "notBarred" regardless of the cellBarred-eRedCap1Rx barring indication in the absence of any other reasons causing the cell to be considered barred. This embodiment is valid for UEs supporting both modes or for UEs supporting only 2Rx reception mode.

Above examples may also be applicable to UEs supporting only 1Rx mode. In such case, the UE would follow the cellBarredRedCap1Rx barring indication or cellBarred-eRedCap1Rx barring indication and ignore cellBarredRedCap1Rx barring indication and cellBarred-eRedCap2Rx barring indication. In one embodiment, the UE supporting both 1Rx and 2Rx operation would follow the 1Rx barring indication and discard the 2Rx barring indication, if received.

The network may also consider the frequency band, and optionally other characteristics of the frequency band, when determining whether to allow the UE to access the cell.

In an example, the network node determines that the cell was barred for the RedCap UE if, at the time the UE accessed that cell, cellBarred-RedCap1Rx was indicating "barred" and the UE's radio access capabilities (sent to the network) indicate that the UE supports 1Rx for at least one of the frequency band(s) included in the frequencyBandList for the SCS of the initial downlink BWP or of the RedCap-specific initial downlink BWP, if configured, wherein the frequencyBandList is broadcasted in SIB1 at the time of cell access. Otherwise, the gNB may consider that the cell is not barred for the UE. This embodiment is valid for UEs supporting only 1Rx reception mode on the frequency band. The UE may disregard the 2Rx barring indication (i.e. the barring indication associated with the 2Rx reception mode), if received.

In one example, network node determines that the cell was barred for the eRedCap UE if at the time the UE accessed that cell cellBarred-eRedCap1Rx was indicating "barred" and the UE's radio access capabilities indicate that the UE supports 1Rx for at least one of the frequency band(s) included in the frequencyBandList for the SCS of the initial downlink BWP or of the eRedCap-specific initial downlink BWP if configured, wherein the frequencyBandList is broadcasted in SIB1 at the time of cell access. Otherwise, the gNB may consider that the cell is not barred for the UE. This embodiment is valid for UEs supporting only 1Rx reception mode on the frequency band. The UE may disregard the 2Rx barring indication (i.e. the barring indication associated with the 2Rx reception mode), if received.

In one example, network node determines that the cell was barred for the RedCap UE if at the time the UE accessed that cell cellBarred-RedCap2Rx was indicating "barred" and the UE's radio access capabilities indicate that the UE supports 2Rx for at least one of the frequency band(s) included in the frequencyBandList for the SCS of the initial downlink BWP or of RedCap-specific initial downlink BWP if configured, wherein the frequencyBandList is broadcasted in SIB1 at the time of cell access. Otherwise, the gNB may consider that the cell is not barred for the UE. This embodiment is valid for UEs supporting both modes or for UEs supporting only 2Rx reception mode on the frequency band. The UE may disregard the 1Rx barring indication (i.e. the barring indication associated with the 1Rx reception mode), if received.

In one example, network node determines that the cell was barred for the eRedCap UE if at the time the UE accessed that cell cellBarred-eRedCap2Rx was indicating "barred" and the UE's radio access capabilities indicate that the UE supports 2Rx for at least one of the frequency band(s) included in the frequencyBandList for the SCS of the initial downlink BWP or of eRedCap-specific initial downlink BWP if configured, wherein the frequencyBandList is broadcasted in SIB1 at the time of cell access. Otherwise, the gNB may consider that the cell is not barred for the UE. This embodiment is valid for UEs supporting both modes or for UEs supporting only 2× reception mode on the frequency band. The UE may disregard the 1Rx barring indication (i.e. the barring indication associated with the 1Rx reception mode), if received.

Figure 4:
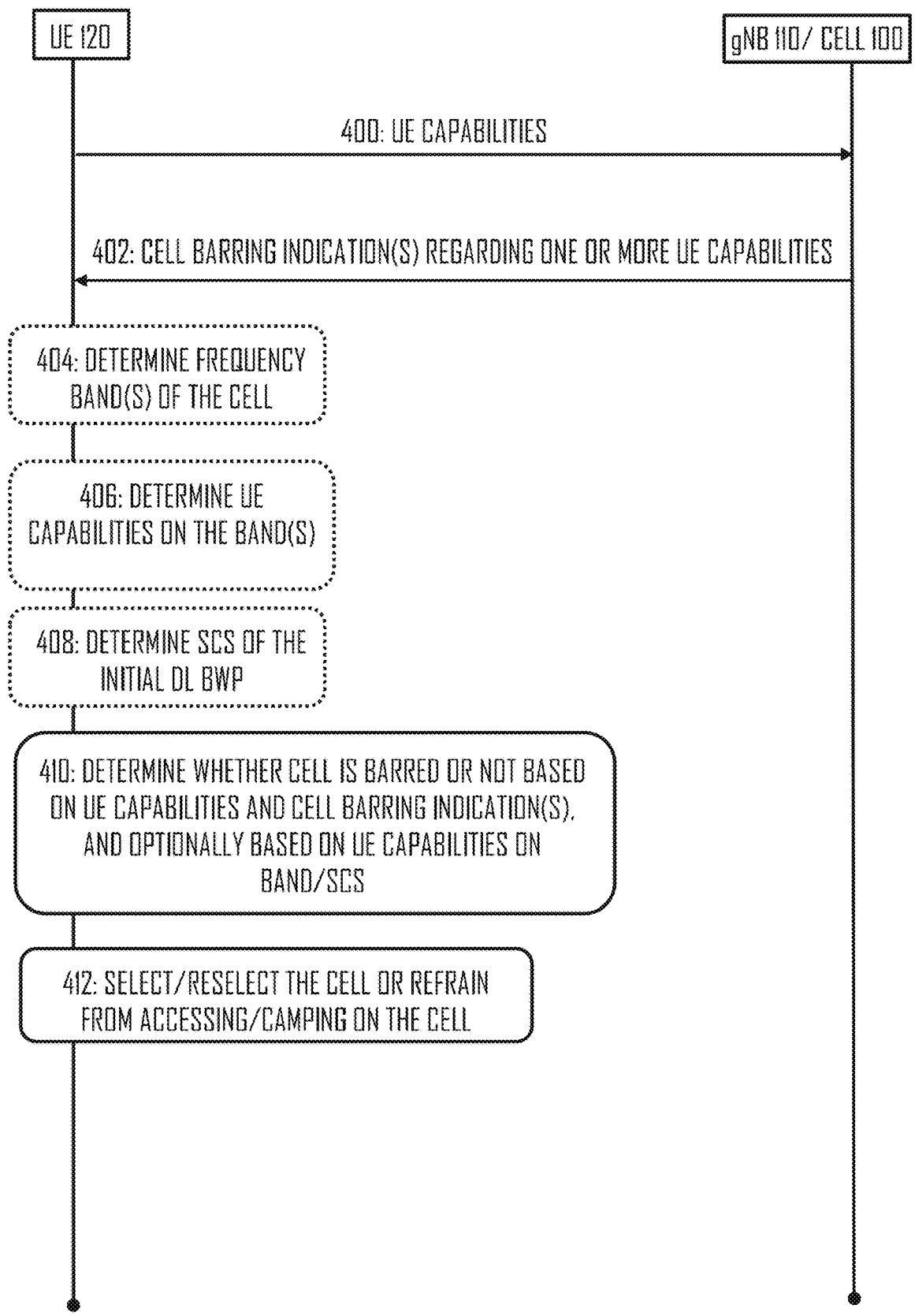
FIGS. 4 and 5 show signaling flow diagrams, according to some embodiments.

FIG. 4 shows a signaling flow diagram depicting some example embodiments.

In step 400 the UE 120 transmits the capability information to the gNB 110 providing cell 100, wherein the capability information indicates which of the 1Rx and 2Rx reception modes the UE supports. This UE capability signalling may be implemented as part of RRC signaling and it enables the UE to inform the network about its capabilities to the network. The UE may transmit the UE capability information in response to a UE capability enquiry received from access node (not illustrated in FIG. 4). UE capability information may comprise various parameters, for example associated with communication capabilities of the UE.

An example of such a parameter is the maximum number of downlink MIMO (multiple input multiple output) layers, which may indicate the maximum number of downlink MIMO layers configured at the UE or supported by the UE in Cell 100, for example for the PDSCH. The UE may be for example configured to indicate the number of maximum number of downlink MIMO layers by a value of a respective parameter (e.g., maxNumberMIMO-LayersPDSCH), or absence of this parameter, in the UE capability information. The maximum number of downlink MIMO layers may be dependent on the frequency band of Cell 100. For example, the UE might be configured with a 1 Rx branch for a first frequency band and 2 Rx branches for a second frequency band. The UE may be configured to determine the maximum number of downlink MIMO layers based on the frequency band of Cell 100. The UE may be for example preconfigured with information about the number of Rx branches supported at different frequency bands. The UE may determine the frequency band, or the maximum number of downlink MIMO layers or the number of supported Rx branches directly, based on the frequency of Cell 100.

In step 402, the UE may receive system information from the gNB 110. The system information may comprise various parameters and configurations for enabling the UE to communicate with the network. The system information may comprise information associate with cell and/or other cell(s). The system information may comprise a master information block (MIB) and one or more system information blocks (SIB), such as for example SIB1, SIB2, SIB3, SIB4, etc., which may be also referred to as SIB messages. The MIB and SIB1 may be configured to carry information for enabling initial access at cell 100 and receiving other SIBs. The UE may be configured to decode the MIB and SIB1 in order to camp on the Cell 100.

SIB1 may comprise one or more of the following: cell selection information, barring information, (e)RedCap device configuration, a frequency band list, PLMN list, cell identifier of the cell, a tracking area code, a RAN area code, a cell reserved flag, connection establishment failure control information, system information scheduling information, serving cell's common uplink and downlink configuration (e.g., for random access channel or paging), supplementary uplink configuration, synchronization signal block (SSB) scheduling information, cell-specific time domain duplex (TDD) UL/DL configuration, IMS (internet protocol multimedia subsystem) emergency bearer support flag of the cell, emergency call over IMS support flag, timer(s) and constant(s) for the UE, or access control information.

The barring information may comprise an indication of the barring status of the cell, e.g., an indication of whether the cell is barred for UEs having particular capability or capabilities, for example the capability of supporting 1 Rx branch operation or the capability of supporting 2 Rx branch operation. The barring status may be therefore associated with at least one capability of a UE. In an embodiment, the indication of the barring status may be associated with a specific frequency band to which the carrier of the cell belongs to. In an embodiment, the indication of the barring status may be associated with all frequency bands to which the carrier of the cell belongs to. Even though in this example the barring status is included in SIB1, UE may, in general, receive the barring status in any suitable control signal or message, examples of which include any SIB messages.

In case the indication of barring status is directed to (e)RedCap UEs, such indication(s) may be provided for example by parameters cellBarredRedCap1Rx, cellBarredRedCap2Rx, cellBarred-eRedCap1Rx, or cellBarred-eRedCap2Rx. Directing the indication of the barring status to a category of devices may comprise configuring the indication such that it is applicable to that category of devices, for example applicable to (e)RedCap UEs but not applicable to non-(e)RedCap UEs. Non-(e)RedCap UEs may therefore ignore the indication of the barring status. It is however noted that example embodiments of the present disclosure may be also applied to UE capabilities of any type of UE, e.g., regardless of whether they belong to a category of reduced capability devices or not.

It is noted that although one cell 100 is depicted in FIG. 4, the UE may receive system information from multiple cells.

In step 410, the UE may then, as explained earlier with several examples, determine whether the cell is barred for the UE based on the UE capabilities regarding 1Rx and/or 2Rx reception modes and barring indication(s). In step 412, the UE may then decide to select/re-select/connect to the cell if the cell is determined as 'not barred', or refrain from accessing/camping on the cell if the cell is determined to be 'barred'.

Optionally, the UE may in step 404 determine the frequency band(s) of the cell (e.g. from frequencyBandList) and determine the UE capabilities on that/those band(s) with respect to the reception modes in step 406, and take those determinations into account when making the barring determination in step 410, as explained above with several examples.

As a further optional feature, the UE may in step 408 determine the SCS of the initial DL BWP, or of the (e)RedCap UE specific initial DL BWP, if configured. The UE may further determine which frequency band(s) it supports, and which SCS(s) are supported on that/these frequency band(s). And the UE may further determine which reception modes the UE supports on that/these frequency band(s). Then, the UE can take these determinations into account when making the barring determination in step 410, as explained above with several examples.

Figure 5:
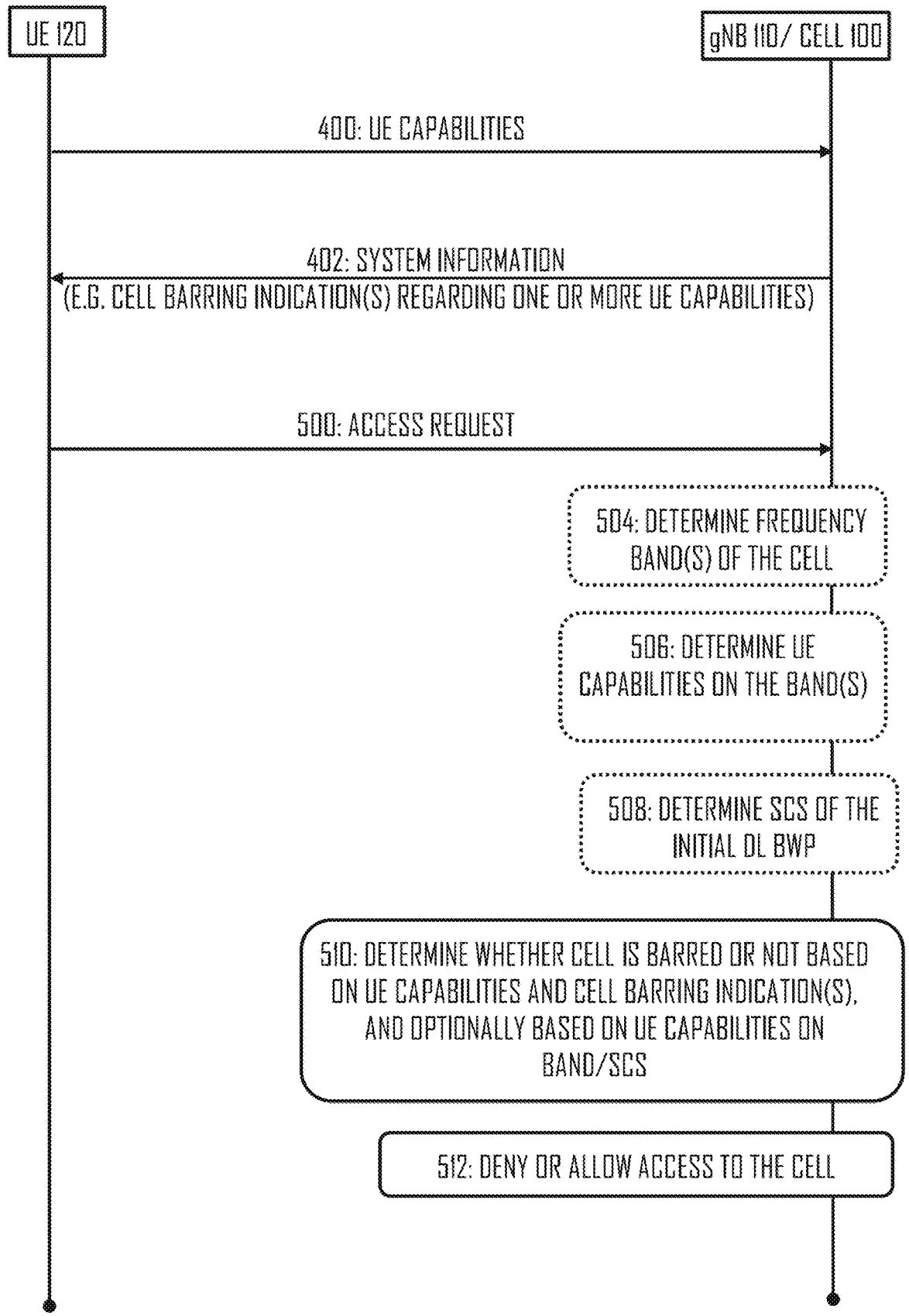

FIG. 5 shows another signaling flow diagram. Steps 400 and 402 of FIG. 5 corresponds to steps 400 and 402 of FIG. 4.

In step 500, the UE performs an access request to the network, possibly in a form of random access procedure. In step 510, the gNB may then, as explained earlier with several examples, determine whether the cell is barred for the UE based on the UE capabilities regarding 1Rx and/or 2Rx reception modes and barring indication(s). In step 512, the gNB may then deny or allow UE's access to the cell based on whether the cell is determined to be 'barred' or 'not barred' for the UE. Such denying or allowing can take place in connection of handover or random access, for example.

Optionally, the network may in step 504 determine the frequency band(s) of the cell's carrier and determine the UE capabilities on that/those band(s) with respect to the reception modes in step 506 (derivable from the UE capability indication of step 400), and take those determinations into account when making the barring determination in step 510, as explained above with several examples.

As a further optional feature, the gNB may in step 508 determine the SCS of the initial BWP or (e)RedCap-specific Initial DL BWP, if configured, of the cell and determine whether the UE supports this SCS on the frequency band (derivable from the UE capability indication of step 400), and take that determination into account when making the barring determination in step 510, as explained above with several examples.

In this way, the UE and/or network may determine the cell barring status based on at least one of the following:

UE's support of 1Rx and/or 2Rx operation for a given frequency band and SCS combination in the UE radio access capabilities (possibly indicated by absence of maxNumberMIMO-LayersPDSCH or presence of maxNumberMIMO-LayersPDSCH=twoLayers respectively for a given frequency band and SCS combination), UE's support for the bands signaled in the list of multiple frequency bands (frequencyBandList in FrequencyInfoDL-SIB in SIB1), Subcarrier Spacing (SCS) of the initial BWP for the downlink or the RedCap-specific initial downlink BWP, if configured, as signaled in SIB1, cell barring indications (cellBarred-eRedCap1Rx, cellBarred-eRedCap2Rx, cellBarredRedCap1Rx, cellBarredRedCap2Rx, as signaled in SIB1).

Some benefits of the embodiments is ensuring deterministic UE behaviour. For example, a UE supporting 1Rx and 2Rx is able to camp and access the cell when 1Rx is barred and 2Rx is not barred, or a UE supporting 1Rx and 2Rx is not able to camp and access the cell when 1Rx is not barred and 2Rx is barred. Further, UE capabilities not relevant for the cell configuration are not taken into account during cell barring determination for (e)RedCap UEs and thus cannot block access to the cell.

A standard implementation of some of the proposed embodiments may be in TS 38.331. In 'cellBarred-eRedCap1Rx', a value barred means that the cell is barred for an eRedCap UE with 1 Rx branch, as defined in TS 38.304. This field is ignored by non-eRedCap UEs. This field is ignored by eRedCap UE supporting 2 Rx operation. In 'cellBarred-eRedCap2Rx', a value barred means that the cell is barred for an eRedCap UE with 2 Rx branches, as defined in TS 38.304. This field is ignored by non-eRedCap UEs. In 'cellBarredRedCap1Rx', value barred means that the cell is barred for a RedCap UE with 1 Rx branch, as defined in TS 38.304. This field is ignored by non-RedCap UEs. This field is ignored by RedCap UE supporting 2 Rx operation. In 'cellBarredRedCap2Rx', a value barred means that the cell is barred for a RedCap UE with 2 Rx branches, as defined in TS 38.304. This field is ignored by non-RedCap UEs. The standard implementation may be as follows:

1> if the UE is a RedCap UE and it is in RRC_IDLE or in RRC_INACTIVE, or if the RedCap UE is in RRC_CONNECTED while T311 is running:
  2> if intraFreqReselectionRedCap is not present in SIB1:
    3> consider the cell as barred in accordance with TS 38.304;
    3> perform barring as if intraFreqReselectionRedCap is set to allowed, upon which the procedure ends;
  2> else:
    3> if the cellBarredRedCap1Rx is present in the acquired SIB1 and is set to barred and the UE supports operation with 1 Rx branch; or
    3> if the cellBarredRedCap2Rx is present in the acquired SIB1 and is set to barred and the UE supports operation with 2 Rx branches; or 3> if the halfDuplexRedCapAllowed is not present in the acquired SIB1 and the UE supports only half-duplex FDD operation:
    4> consider the cell as barred in accordance with TS 38.304;
    4> perform barring based on intraFreqReselectionRedCap as specified in TS 38.304, upon which the procedure ends;

[ . . . ]

1> if the UE is an eRedCap UE and it is in RRC_IDLE or in RRC_INACTIVE, or if the eRedCap UE is in RRC_CONNECTED while T311 is running:
  2> if intraFreqReselection-eRedCap is not present in SIB1:
    3> consider the cell as barred in accordance with TS 38.304;
    3> perform barring as if intraFreqReselection-eRedCap is set to allowed upon which the procedure ends;
  2> else:
    3> if the cellBarred-eRedCap1Rx is present in the acquired SIB1 and is set to barred and the UE supports operation with 1 Rx branch; or
    3> if the cellBarred-eRedCap2Rx is present in the acquired SIB1 and is set to barred and the UE supports operation with 2 Rx branches; or
    3> if the halfDuplexRedCapAllowed is not present in the acquired SIB1 and the UE supports only half-duplex FDD operation:
      4> consider the cell as barred in accordance with TS 38.304;
      4> perform barring based on intraFreqReselection-eRedCap as specified in TS 38.304 upon which the procedure ends.

A standard implementation of some of the proposed embodiments may be in TS 38.331. In 'cellBarred-eRedCap1Rx', a value barred means that the cell is barred for an eRedCap UE with 1 Rx branch, as defined in TS 38.304. This field is ignored by non-eRedCap UEs. This field is ignored by eRedCap UE supporting 2 Rx operation for any of the frequency bands included in the frequencyBandList for the SCS of the initial downlink BWP or, RedCap-specific initial downlink BWP if configured. In 'cellBarred-eRedCap2Rx', a value barred means that the cell is barred for an eRedCap UE with 2 Rx branches, as defined in TS 38.304. This field is ignored by non-eRedCap UEs. In 'cellBarredRedCap1Rx', value barred means that the cell is barred for a RedCap UE with 1 Rx branch, as defined in TS 38.304. This field is ignored by non-RedCap UEs. This field is ignored by RedCap UE supporting 2 Rx operation for any of the frequency bands included in the frequencyBandList for the SCS of the initial downlink BWP or, RedCap-specific initial downlink BWP if configured. In 'cellBarredRedCap2Rx', a value barred means that the cell is barred for a RedCap UE with 2 Rx branches, as defined in TS 38.304. This field is ignored by non-RedCap UEs. The standard implementation may be as follows:

1> if the UE is a RedCap UE and it is in RRC_IDLE or in RRC_INACTIVE, or if the RedCap UE is in RRC_CONNECTED while T311 is running:
  2> if intraFreqReselectionRedCap is not present in SIB1:
    3> consider the cell as barred in accordance with TS 38.304;
    3> perform barring as if intraFreqReselectionRedCap is set to allowed, upon which the procedure ends;
  2> else:
    3> if the cellBarredRedCap1Rx is present in the acquired SIB1 and is set to barred and the UE supports operation with 1 Rx branch for any of the frequency bands included in the frequencyBandList for the SCS of the initial downlink BWP or, RedCap-specific initial downlink BWP if configured; or
    3> if the cellBarredRedCap2Rx is present in the acquired SIB1 and is set to barred and the UE supports operation with 2 Rx branches for any of the frequency bands included in the frequencyBandList for the SCS of the initial downlink BWP or, RedCap-specific initial downlink BWP if configured; or
    3> if the halfDuplexRedCapAllowed is not present in the acquired SIB1 and the UE supports only half-duplex FDD operation:
      4> consider the cell as barred in accordance with TS 38.304;
      4> perform barring based on intraFreqReselectionRedCap as specified in TS 38.304, upon which the procedure ends;

[ . . . ]

1> if the UE is an eRedCap UE and it is in RRC_IDLE or in RRC_INACTIVE, or if the eRedCap UE is in RRC_CONNECTED while T311 is running:
  2> if intraFreqReselection-eRedCap is not present in SIB1:
    3> consider the cell as barred in accordance with TS 38.304;
    3> perform barring as if intraFreqReselection-eRedCap is set to allowed upon which the procedure ends;
  2> else:
    3> if the cellBarred-eRedCap1Rx is present in the acquired SIB1 and is set to barred and the UE supports operation with 1 Rx branch for any of the frequency bands included in the frequencyBandList for the SCS of the initial downlink BWP or, eRedCap-specific initial downlink BWP if configured; or
    3> if the cellBarred-eRedCap2Rx is present in the acquired SIB1 and is set to barred and the UE supports operation with 2 Rx branches for any of the frequency bands included in the frequencyBandList for the SCS of the initial downlink BWP or, eRedCap-specific initial downlink BWP if configured; or
    3> if the halfDuplexRedCapAllowed is not present in the acquired SIB1 and the UE supports only half-duplex FDD operation:
      4> consider the cell as barred in accordance with TS 38.304;
      4> perform barring based on intraFreqReselection-eRedCap as specified in TS 38.304 upon which the procedure ends.

Figure 6:
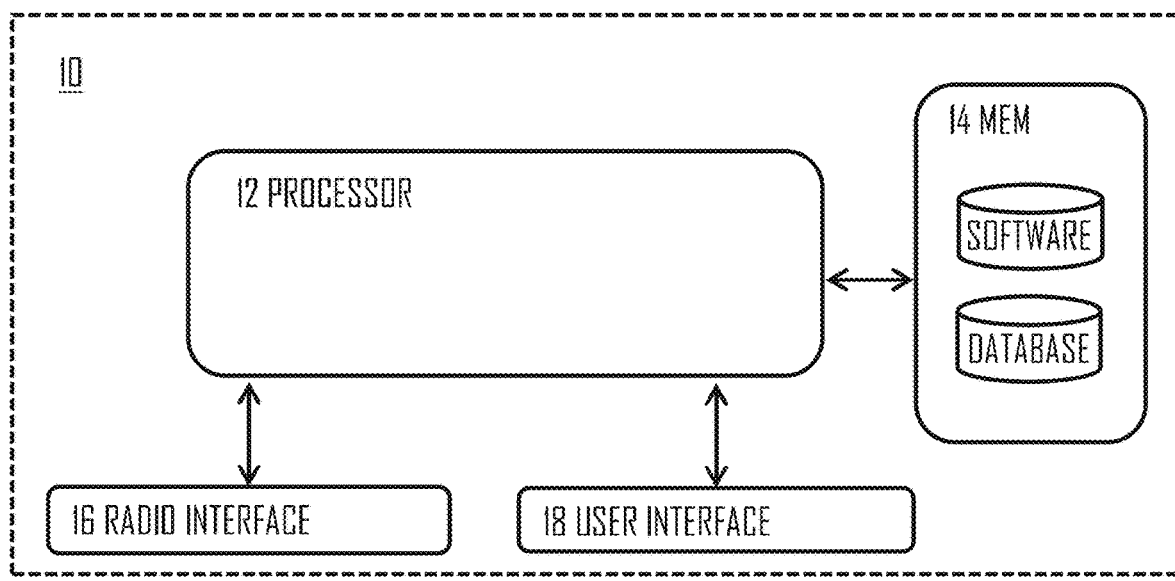
FIG. 6 illustrates apparatuses, according to some embodiments.

An embodiment, as shown in FIG. 6, provides an apparatus 10 comprising a control circuitry (CTRL) 12, such as at least one processor, and at least one memory 14 storing instructions that, when executed by the at least one processor, cause the apparatus at least to carry out any one of the above-described processes. In an example, the at least one memory and the computer program code (software), are configured, with the at least one processor, to cause the apparatus to carry out any one of the above-described processes. The control circuitry 12 may comprise relevant circuitry/ies for performing the functions, according to any of the embodiments.

The memory may be implemented using any suitable data storage technology, such as semiconductor-based memory devices, flash memory, magnetic memory devices and systems, optical memory devices and systems, fixed memory and removable memory. The memory may comprise a database for storing data.

In an embodiment, the apparatus 10 is or is comprised in a UE, such as the UE 120. The apparatus may be caused to execute some of the functionalities of the above described processes, such as the steps of FIG. 2, for example.

In another embodiment, the apparatus 10 is or is comprised in a network node, such as the gNB 110. The apparatus may be caused to execute some of the functionalities of the above described processes, such as the steps of FIG. 3, for example.

The apparatus may further comprise a radio interface (TRX) 16 comprising hardware and/or software for realizing communication connectivity according to one or more communication protocols. The TRX may provide the apparatus with communication capabilities to a user equipment and/or to other entities of the base station, for example.

The apparatus may also comprise a user interface 18 comprising, for example, at least one keypad, a microphone, a touch display, a display, a speaker, etc. The user interface may be used to control the apparatus by the user. UE In an embodiment, an apparatus carrying out at least some of the embodiments described comprises at least one processor and at least one memory including a computer program code, wherein the at least one memory and the computer program code are configured, with the at least one processor, to cause the apparatus to carry out the functionalities according to any one of the embodiments described. According to an aspect, when the at least one processor executes the computer program code, the computer program code causes the apparatus to carry out the functionalities according to any one of the embodiments described. According to another embodiment, the apparatus carrying out at least some of the embodiments comprises the at least one processor and at least one memory including a computer program code, wherein the at least one processor and the computer program code perform at least some of the functionalities according to any one of the embodiments described. Accordingly, the at least one processor, the memory, and the computer program code form means for carrying out at least some of the embodiments described. According to yet another embodiment, the apparatus carrying out at least some of the embodiments comprises a circuitry including at least one processor and at least one memory including computer program code. When activated, the circuitry causes the apparatus to perform the at least some of the functionalities according to any one of the embodiments described.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

A term non-transitory, as used herein, is a limitation of the medium itself (i.e. tangible, not a signal) as opposed to a limitation on data storage persistency (e.g. RAM vs. ROM).

As used herein the term "means" is to be construed in singular form, i.e. referring to a single element, or in plural form, i.e. referring to a combination of single elements. Therefore, terminology "means for [performing A, B, C]", is to be interpreted to cover an apparatus in which there is only one means for performing A, B and C, or where there are separate means for performing A, B and C, or partially or fully overlapping means for performing A, B, C. Further, terminology "means for performing A, means for performing B, means for performing C" is to be interpreted to cover an apparatus in which there is only one means for performing A, B and C, or where there are separate means for performing A, B and C, or partially or fully overlapping means for performing A, B, C.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A user equipment, comprising:
at least one processor; and
at least one memory storing instructions that, when executed by the at least one processor, cause the user equipment, at least to:
support a first reception mode with only one receive (Rx) branch and a second reception mode with at least two Rx branches, wherein the user equipment supports both reception modes on a same frequency band;
detect, from a network node associated with a cell, a first barring indication associated with the first reception mode and a second barring indication associated with the second reception mode, wherein the first barring indication indicates that the cell is barred and the second barring indication indicates that the cell is not barred, or vice versa; and
determine whether or not the cell is barred for the user equipment based on the supported reception modes on the frequency band and at least one of the first barring indication and the second barring indication, wherein
when the first barring indication indicates that the cell is not barred and the user equipment supports the first reception mode on the frequency band, the cell is determined to be not barred and the second barring indication is ignored, or
when the second barring indication indicates that the cell is not barred and the user equipment supports the second reception mode on the frequency band, the cell is determined to be not barred and the first barring indication is ignored.

2. The user equipment of claim 1, wherein the user equipment is further caused to:
refrain from cell selection or cell re-selection when the cell is deter-mined to be barred.

3. The user equipment of any of claim 1, wherein the user equipment is further caused to:
transmit to the network node a capability indication indicating that the user equipment supports the first reception mode and the second reception mode.

4. The user equipment of claim 1, wherein the user equipment is further caused to:
receive, from the network node, a list of at least one frequency band to which a carrier of the cell belongs to.

5. The user equipment of claim 4, wherein, the frequency band is included in the list of at least one frequency band received from the network.

6. The user equipment of claim 1, wherein, based on that the user equipment supports the first reception mode and the second reception mode on the frequency band with a subcarrier spacing corresponding to the subcarrier spacing of an initial downlink bandwidth part and the first or the second barring indication indicates the cell is not barred, the user equipment determines that the cell is not barred for that frequency band.

7. The user equipment of claim 1, wherein the user equipment is further caused to:
select which one of the first and second barring indications to take into account, and
disregard the other, for determining whether the cell is barred or not, wherein the selecting is based on at least one of the following: subcarrier spacing of an initial downlink bandwidth part of the cell, information about at least one frequency band to which a carrier of the cell belongs to, or on which at least one frequency band and for which at least one subcarrier spacing the user equipment supports the first reception mode and the second reception mode.

8. The user equipment of claim 1, wherein the first and second barring indications are cell specific and common to all frequency bands of the cell.

9. The user equipment of claim 1, wherein the first and second barring indications are frequency band specific.

10. The user equipment of claim 1, wherein the user equipment is a reduced capability user equipment or an enhanced reduced capability user equipment.

11. A network node, comprising:
at least one processor; and
at least one memory storing instructions that, when executed by the at least one processor, cause the network node associated with a cell, at least to:
receive from a user equipment a capability indication indicating that the user equipment supports a first reception mode with only one receive (Rx) branch and a second reception mode with at least two Rx branches, wherein the user equipment supports both reception modes on a same frequency band;
transmit, to the user equipment, a first barring indication associated with the first reception mode and a second barring indication associated with the second reception mode, wherein the first barring indication indicates that the cell is barred and the second barring indication indicates that the cell is not barred, or vice versa; and
determine whether or not the cell is barred for the user equipment based on the supported reception modes on the frequency band and at least one of the first barring indication and the second barring indication, wherein:
when, at the time the user equipment accessed that cell, the first barring indication indicated that the cell is not barred and the user equipment supports the first reception mode on the frequency band, the cell is determined to be not barred and the second barring indication is ignored, or when, at the time the user equipment accessed that cell, the second barring indication indicated that the cell is not barred and the user equipment supports the second reception mode on the frequency band, the cell is determined to be not barred and the first barring indication is ignored.

12. A method performed by a user equipment, the method comprising:

supporting a first reception mode with only one receive (Rx) branch and a second reception mode with at least two Rx branches, wherein the user equipment supports both reception modes on a same frequency band;

detecting, from a network node associated with a cell, a first barring indication associated with the first reception mode and a second barring indication associated with the second reception mode, wherein the first barring indication indicates that the cell is barred and the second barring indication indicates that the cell is not barred or vice versa; and determining whether or not the cell is barred for the user equipment based on the supported reception modes on the frequency band and at least one of the first barring indication and the second barring indication, wherein when the first barring indication indicates that the cell is not barred and the user equipment supports the first reception mode on the frequency band, the cell is determined to be not barred and the second barring indication is ignored, or when the second barring indication indicates that the cell is not barred and the user equipment supports the second reception mode on the frequency band, the cell is determined to be not barred and the first barring indication is ignored.

* * * * *